United States Patent [19]

Banno et al.

[11] Patent Number: 4,644,418
[45] Date of Patent: Feb. 17, 1987

[54] FLOPPY DISK CONTROL APPARATUS

[75] Inventors: Haruhiko Banno; Koichi Dewa, both of Tokyo, Japan

[73] Assignee: Kabushiki Kaisha Toshiba, Kawasaki, Japan

[21] Appl. No.: 620,622

[22] Filed: Jun. 14, 1984

[30] Foreign Application Priority Data

Jun. 28, 1983 [JP] Japan ................................. 58-115097

[51] Int. Cl.⁴ .............................................. G11B 5/09
[52] U.S. Cl. .......................................... 360/39; 360/48
[58] Field of Search ............................. 360/39, 48, 78

[56] References Cited

U.S. PATENT DOCUMENTS 4,272,793  6/1981  Van Landingham ................. 360/78
4,298,897 11/1981  Arter et al. ........................... 360/78

Primary Examiner—Vincent P. Canney
Attorney, Agent, or Firm—Cushman, Darby and Cushman

[57] ABSTRACT

When a FORMAT COMMAND is executed, a track density data indicating a track density of 96 TPI or 48 TPI is written into a discrimination area of a disk. When the disk is set into the FDD and is used, a CPU reads out track density data from the disk and produces a flag byte data, including the track density data, and stores it into a main memory. When SEEK COMMAND is executed, a track density of the disk is checked to see if it is 96 TPI or 48 TPI on the basis of the flag byte data. If it is determined that the disk of 48 TPI is set into the FDD for use in driving a disk of 96 TPI according to this discrimination, an FDC outputs a STEP signal for allowing the traveling distance of the head to be doubled as compared to an ordinary distance, thereby controlling the seeking operation by the FDD so as to assuredly move the head to a predetermined desired track.

1 Claim, 7 Drawing Figures

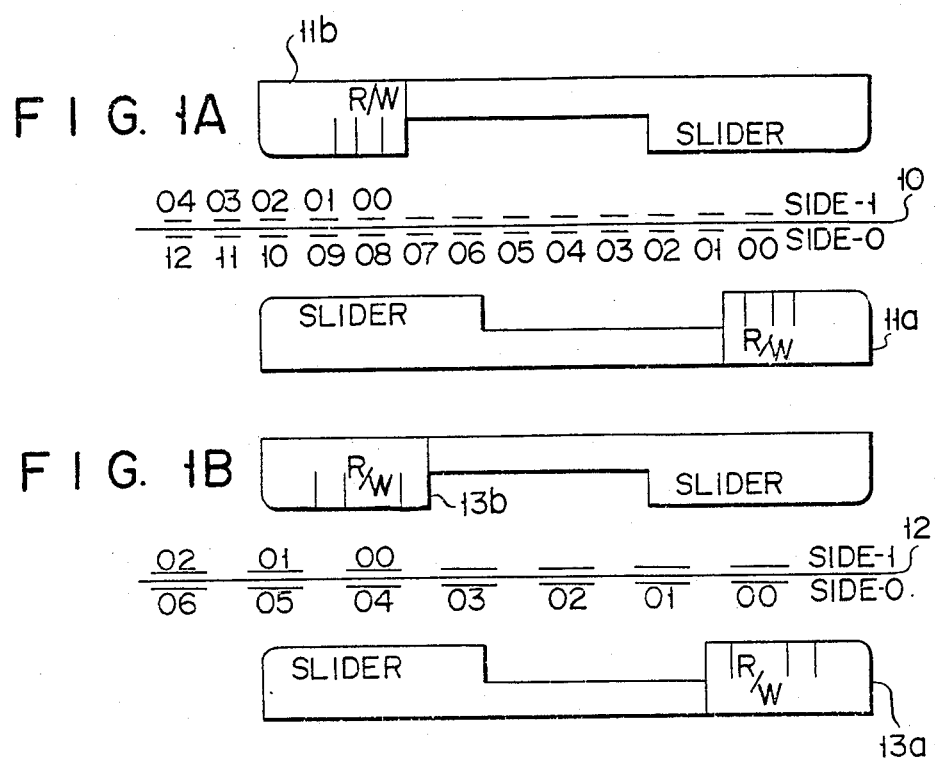
FIG. 1A
FIG. 1B
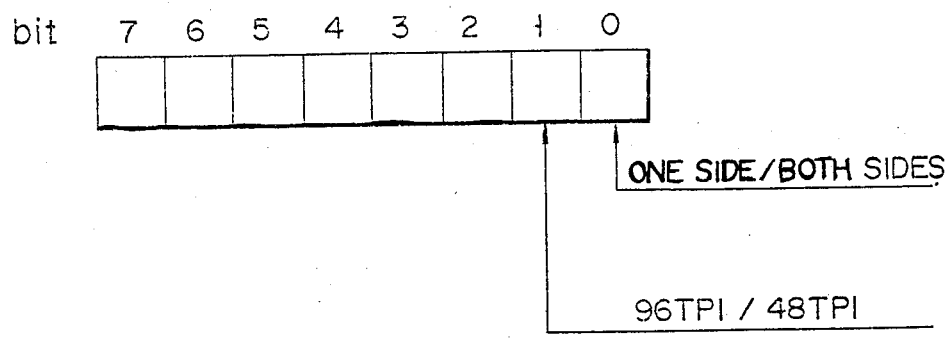
FIG. 2

FLOPPY DISK CONTROL APPARATUS

BACKGROUND OF THE INVENTION

The present invention relates to a floppy disk control apparatus for controlling the recording operation for floppy disks having different track densities.

Recently, floppy disk apparatuses have come into widespread use as external storage devices. For example, they are used in personal computers, word processors, etc. In particular, mini floppy disk apparatuses, using 5.25 inch disks and serving as recording media, have been rapidly developed since the apparatus is small and can be widely used in many fields.

There are various kinds of data formats of disks used with mini floppy disk apparatuses. A typical one is set forth in the article, "DISK OPERATING SYSTEM-IBM PERSONAL COMPUTER LANGUAGE SERIES FIRST EDITION", Version 2.00 (January, 1983) pages 0-7. According to the above literature, a file allocation table is prepared in a particular area in the disk, and the format of the disk is identified by the first byte thereof. In the foregoing literature, five kinds of disk formats are defined, and it is disclosed in pages 1 to 10 that only a floppy disk having a track density of 48 TPI (40 tracks per side) can be used.

On the other hand, recently, a mini floppy disk apparatus with a track density of 96 TPI (96 tracks per inch) and a recording ability of 80 tracks per side has been developed based on an improvement in magnetic recording technology. In the mini floppy disk apparatus for driving a 96 TPI disk, during a seeking operation, a magnetic head may travel only half the distance that would be traveled using 96 TPI. Thus, in the mini floppy disk apparatus, when a disk having a track density of 48 TPI is inserted and the reading/writing operations are performed, the magnetic head will have been located, upon the seeking operation, in an intermediate position between tracks. Namely, in the 96 TPI mini floppy disk apparatus, it is impossible to use a 48 TPI disk.

SUMMARY OF THE INVENTION

It is an object of the present invention to provide a floppy disk control apparatus which can effectively use a 96 TPI disk drive apparatus to drive a 48 TPI disk.

In the present invention, there is provided a means for writing track density data, according to the track density of a floppy disk, into a particular area (for example, into the 0th track) of the floppy disk when executing a format command. When a floppy disk is used, the above track density data is read out from the floppy disk by a memory control means and is written in a file allocation table of a main memory. During a seeking operation, head travel is controlled by a head traveling control means in accordance with the track density data in the file allocation table so as to be moved to a predetermined desired track.

Such control operations enable a 96 TPI disk drive apparatus to drive a 48 TPI disk.

BRIEF DESCRIPTION OF THE DRAWINGS

FIG. 1A is a diagram showing a head and a track arrangement in a disk of 96 TPI;

FIG. 1B is a diagram showing a head and a track arrangement in a disk of 48 TPI;

FIG. 2 is a diagram showing a data format of flag byte to be produced by a microprocessor in FIG. 3;

DETAILED DESCRIPTION OF THE PREFERRED EMBODIMENT

Figure 3:
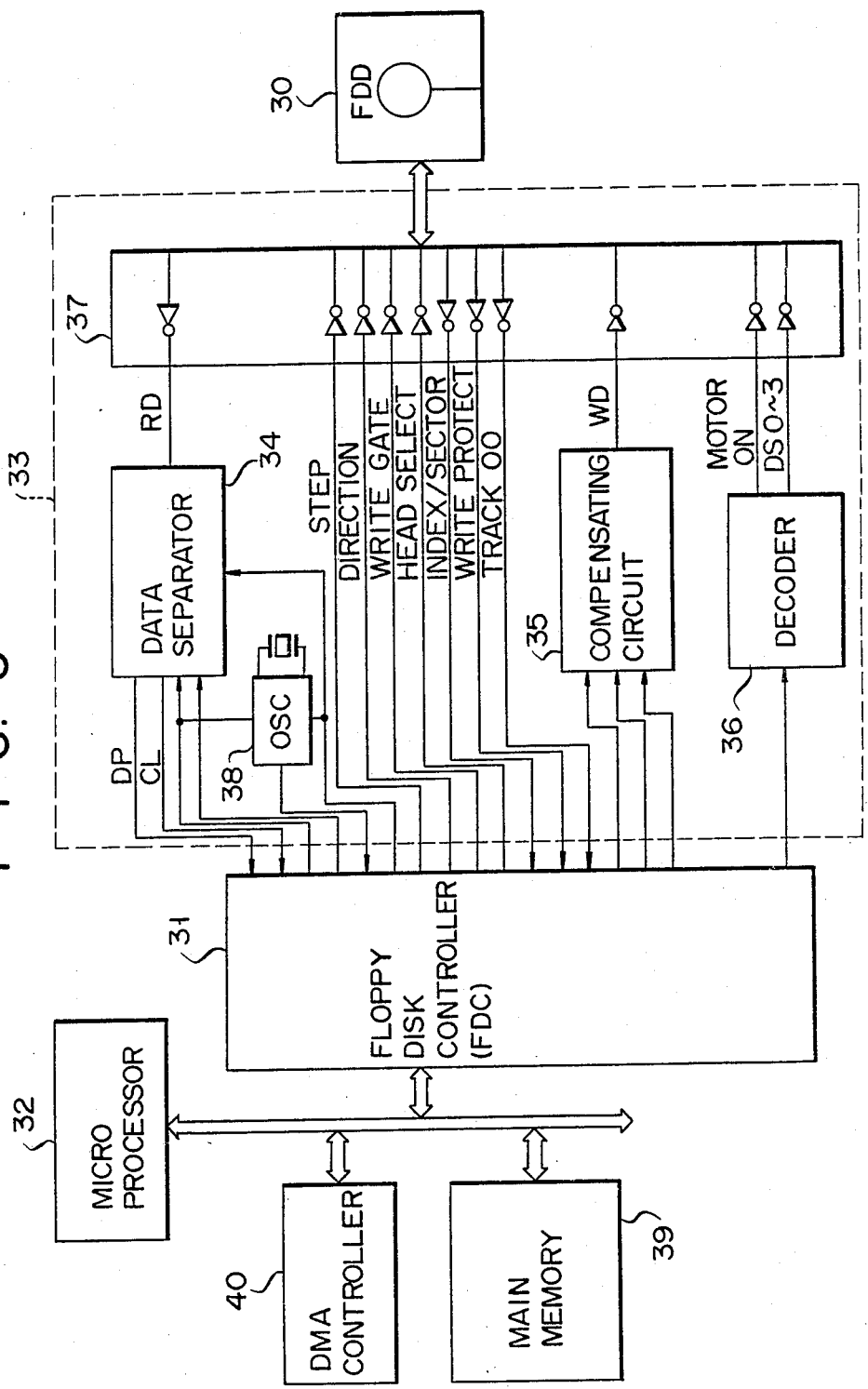
FIG. 3 is a block diagram showing a floppy disk control apparatus according to an embodiment of the present invention.

FIG. 3 is a block diagram showing a floppy disk control apparatus according to an embodiment of the present invention. In FIG. 3, a floppy disk drive apparatus (FDD) 30 is a main body of the apparatus for driving a floppy disk and performing the reading/writing operations of data. A floppy disk controller (FDC) 31 is a logic circuit for controlling the FDD 30 and is, for example, an LSI (large scale integrated circuit) such as, for example, "μPD765A" made by Nippon Electric Co., Ltd. The FDC 31 constitutes an interface between a micro processor (CPU) 32 serving as a host system. FDD 30 executes various kinds of commands (FORMAT, SEEK, READ/WRITE, etc.) transmitted from the CPU 32, and performs the operations of data transfer, loading/unloading control of a magnetic head (or head) of the FDD 30, and the like.

An interface circuit 33 is provided between the FDC 31 and the FDD 30 and comprises: a data separator 34; a compensating circuit 35; a decoder 36; and a driver receiver circuit 37. The data separator 34 consists of a VFO (variable frequency oscillator) circuit using the PLL (phase locked loop). Data separator 34 separates read data RD output from the FDD 30 into its data and clock components. The compensating circuit 35 performs write pre-compensation for write data WD to be sent from the FDC 31 to the FDD 30. The decoder 36 decodes drive select signals DS0 to DS3 output from the FDC 31 to select the FDD 30 and generates them when a plurality of FDDs 30 (for example, four FDDs) are connected. Furthermore, the driver/receiver circuit 37 is the circuit for transferring various kinds of signals to be received/transmitted between the FDC 31 and the FDD 30 to the FDC 31 or FDD 30. In addition, an oscillator (OSC) 38 generates the necessary sync signals for synchronizing the phases of the read data pulse DP and clock pulse (window signal) CL, which are separated by the data separator 34 in the FDC 31.

The principal signals to be transferred between the FDC 31 and the FDD 30 through the interface circuit 33 are as follows. First of all, as the signals from the FDC 31 to the FDD 30, there are the signals such as:

(a) STEP—step pulse signal for allowing the head of the FDD 30 to travel;

(b) DIRECTION—signal to designate the traveling direction when moving the head; and (c) HEAD SELECT—signal for selecting either one of the head of SIDE-1 or the head of SIDE-0.

Then, as the signals from the FDD 30 to the FDC 31, there are the signals such as:

(d) INDEX/SECTOR—detection signal for the index/sector hole of the disk;

(e) WRITE PROTECT—signal indicating that the disk into which the write prevention processing is being performed is set into the FDD 30; and (f) TRACK 00—signal representing that the head is on the track 00.

In addition, an activation signal MOTOR ON for a spindle motor to rotate the disk in the FDD 30 is output from the decoder 36.

The CPU 32 operates on the basis of a program such as an operating system and the like stored in a main memory 39 and performs the data processing for the FDD 30. In this case, a DMA (direct memory access) controller 40 for use in the data transfer to the FDD 30 is used to reduce the burden on the CPU 32 and is connected to a system bus 41.

The operation of the present invention will be described. It is assumed that the FDD 30 shown in FIG. 3 is the apparatus for driving a 96 TPI disk. The arranged relationships among the track position of a disk 10 and respective heads 11a and 11b of side-0 and side-1 are as shown in FIG. 1A. As shown in FIG. 1A, when the respective heads 11a and 11b are located in track 00 of the disk, there are eight tracks between the heads 11a and 11b. However, in the case of driving a disk having a track density of 48 TPI, if the arranged relationships among tracks of a disk 12 and respective heads 13a and 13b are as shown in FIG. 1B, there are four tracks between the heads 13a and 13b. That is, the traveling distance of each of the heads 11a and 11b for a 96 TPI disk is one half the traveling distance of each of the heads 13a and 13b for the 48 TPI disk. Therefore, in the case where the FDD 30, used for a 48 TPI disk of, is used for a 96 TPI disk, it is necessary that the heads 11a and 11b travel twice the distance in the seeking operation.

Figure 4:
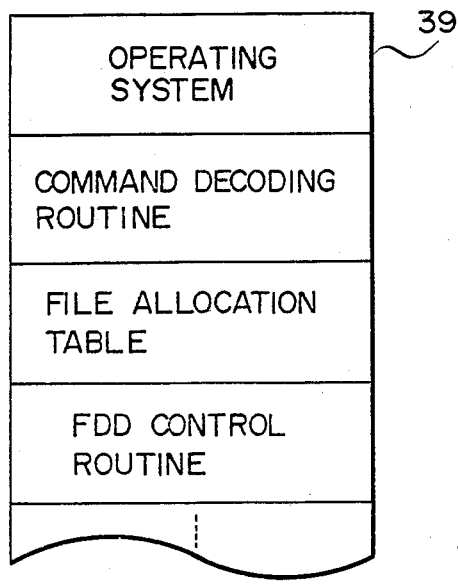
FIG. 4 is a diagram showing one example of the memory content of a main memory in FIG. 3.
Figure 5A:
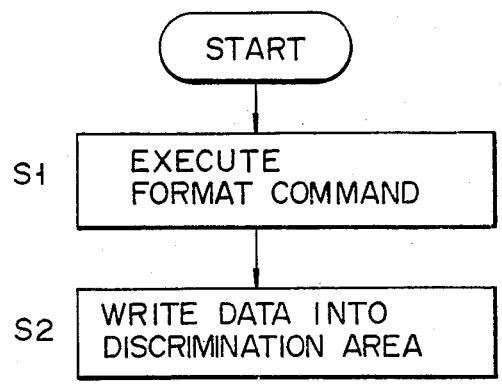
FIGS. 5A and 5B show flow charts to describe the operation of the apparatus in FIG. 3.

On one hand, when the disk having a track density of 96 TPI or 48 TPI is placed into the FDD 30, the FORMAT COMMAND is first executed (in step S1 to FIG. 5A). Namely, for example, when the FORMAT COMMAND is input to the CPU 32 from a keyboard, or the like, serving as an external device, the CPU 32 interprets the content of the FORMAT COMMAND in accordance with a command interpretation routine previously stored in the main memory 39, as shown in FIG. 4. The CPU 32 executes an FDD control routine stored in the main memory 39 and supplies the interpreted FORMAT COMMAND to the FDC 31. The FDC 31 executes the FORMAT COMMAND and controls the driving of the FDD 30 through the interface circuit 33. Track density data corresponding to the track density (96 TPI or 48 TPI) of the disk and other attributed data (for example, data representing double density and both-sides recording method) are written into the discrimination area of the track 00 (into the area in which the attributed information of the disk is recorded) of the disk set into the FDD 30 (in step S2 of FIG. 5A).

Figure 5B:
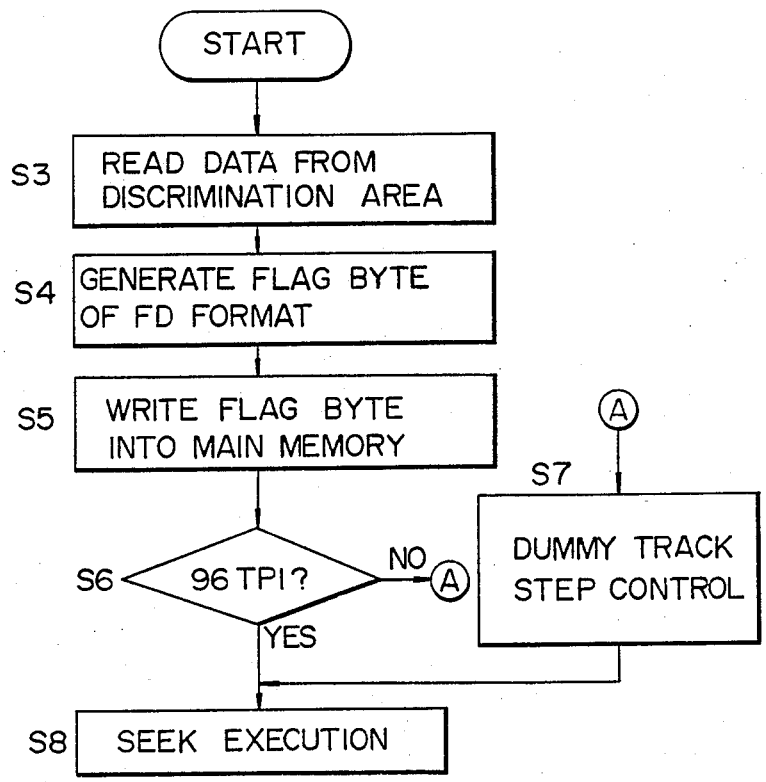

In this way, the track density data and the like, written into the discrimination area of the disk, are read out by the operation of the FDC 31 and are sent to the CPU 32 (in step S3 of FIG. 5B). The CPU 32 produces flag byte data as shown in FIG. 2 on the basis of the data to be sent from the FDC 31 (in step S4 of FIG. 5B). This flag byte data is constituted in the manner such that, for example, the portion of bit "0" is the data indicative of the one-side/both-sides recording method of the disk, and the portion of bit "1" is the data representing the track density of 96 TPI/48 TPI, and each bit indicates other attributed data of the disk. The flag byte data produced by the CPU 32 is stored in the file allocation table of the main memory 39 (in step S5 of FIG. 5B).

When the reading/writing operations of the data for the disk in the FDD 30 are started, a SEEK COMMAND is sent from the CPU 32 to the FDC 31. The SEEK COMMAND is the command for allowing the head of the FDD 30 to be moved to a predetermined track of the disk. CPU 32 determines whether the track density of the disk inserted into the FDD 30 is 96 TPI or 48 TPI on the basis of the flag byte data, which is the content of the file allocation table of the main memory 39 (in step S6 of FIG. 5B). As previously mentioned, the FDD 30 is assumed to be a 96 TPI disk drive apparatus. When CPU 32 determines that a 96 TPI disk is inserted into the FDD 30, the CPU 32 outputs the SEEK COMMAND and a desired track number (e.g., track "20") of the head of the FDC 31. FDC 31 executes the SEEK COMMAND (in step S8 of FIG. 5B) and controls the allowed movement of the head of the FDD 30 to track "20" of the disk. Practically speaking, the FDC 31 has stored the present position of the head (for instance, track "10") and the head is moved from track "10" to track "20"; therefore, the DIRECTION signal is ascending-sequentially set, and ten pulses of the STEP signal are continuously output. Since the traveling direction of the head is set in track "20" in response to the DIRECTION signal, the FDD 30 permits the head to be sought by 10 tracks for every track in response to the 10-pulse STEP signal. The head is ordinarily arranged so as to be driven by a stepping motor. This permits the FDD 30 to seek the head by 10 tracks, thereby moving the head to the desired track "20".

However, when CPU 32 determines that a 48 TPI disk inserted into the FDD 30 when the CPU 32 allows the head to be moved to the desired track (e.g., track "20"), the CPU 32 performs the dummy-track step control to double the traveling distance as compared to the case of the disk of 96 TPI (in step S7 of FIG. 5B). Namely, the CPU 32 outputs the SEEK COMMAND and object track number (20×2=40) to the FDC 31. In this case, the object track number is, for example, "20" on the actual disk. The FDC 31 ascending-sequentially sets the DIRECTION signal when it is assumed that the present head position is located at track "10", similar to the above-described case of the disk of 96 TPI. Furthermore, the FDC 31 continuously outputs the 20 pulses of the STEP signal ((track number "20" − track number "10")×2) to the FDD 30. The FDD 30 seeks the head by 20 tracks in response to the 20-pulse STEP signal and moves the head to the desired track "20". In this case, the seeking operation of 20 tracks allows the head to be moved to track "30" on the disk of 96 TPI. Therefore, the FDD 30, used for the disk of 96 TPI, moves the head by 10 tracks in response to the dummy step signal of 10 tracks. Thus, in this case, the head moves to track "20" on the disk of 48 TPI.

As described above, in the FDD 30 for driving the disk inherently having a track density of 96 TPI, in the case where the disk having a different track density of 48 TPI is set into the FDD 30, it is possible to move the head to a predetermined track on the disk and to assuredly execute the read/write of the data. That is, upon executing the FORMAT COMMAND, the CPU 32 sets the track density data to specify the track density of the disk into the track "00" of the disk, and thereafter it produces the flag byte data including the track density data and allows it to be stored in the main memory 39. When the SEEK COMMAND is executed, the CPU 32 checks the track density of the disk inserted into the FDD 30 on the basis of the flag byte data. On the basis of this discrimination, the FDC 31 outputs the STEP signal which is applied to the seeking operation of the head in accordance with the track density of the disk to the FDD 30. Consequently, even in the case where a track density of a disk to be set into the FDD 30 differs, it is possible to assuredly execute the seeking operation of the head and to carry out the reading/writing operation of the data for the disk.

What is claimed is:

1. A floppy disk control apparatus comprising:

FORMAT COMMAND executing means for executing, on the basis of a program stored in a memory, a FORMAT COMMAND for formatting a floppy disk and designating a particular data storage region thereof for receiving track density data;

disk writing means for writing track density data to said particular data storage region of said floppy disk when the FORMAT COMMAND is executed;

memory control means for reading track density data from said particular data storage region, producing flag byte data of a floppy disk format which includes flag bit data corresponding to the track density data, and writing the flag byte data into a file allocation table of said memory;

seeking operation executing means for executing such a seeking operation that a floppy disk head is to be moved to a desired track of said floppy disk upon reading/writing operations of data for said floppy disk; and head traveling control means for outputting a step pulse signal according to the travelling distance of said head as specified by said seeking operation executing means when using a floppy disk having tracks of a first high density, and outputting, when using a floppy disk having tracks of a second density, lower than said first density, a step pulse signal suitable for the travelling distance of said head for said high-density tracks, said step pulse signals being output in accordance with the flag bit data written in said file allocation table of said memory when the seeking operation is executed.

* * * * *